United States Patent
Skoff et al.

[11] Patent Number: 6,105,510
[45] Date of Patent: Aug. 22, 2000

[54] FOLDING TABLE FOR THE INTERIOR FURNISHING OF VEHICLES

[75] Inventors: Gerhard Skoff, Vienna; Anton Strassgurtl, Schwadorf; Werner Bogner, Vienna, all of Austria

[73] Assignee: Steyr-Daimler-Puch Aktiengesellschaft

[21] Appl. No.: 09/373,510

[22] Filed: Aug. 12, 1999

[30]     Foreign Application Priority Data

Aug. 13, 1998 [AT] Austria .................................. 535/98 U

[51] Int. Cl.⁷ .................................................. A47B 37/00
[52] U.S. Cl. ........................... 108/44; 108/149; 108/171; 296/24.1
[58] Field of Search ................................ 108/42, 44, 149, 108/115, 67, 162, 164, 166, 167, 168, 170, 171, 172, 179, 48; 296/24.1

[56]                References Cited

U.S. PATENT DOCUMENTS

| 1,819,516 | 8/1931 | Kelly ........................................ 108/149 |
| 1,928,731 | 10/1933 | Mattson . |
| 2,818,317 | 12/1957 | Little . |
| 2,947,585 | 8/1960 | Fazio . |
| 3,592,148 | 7/1971 | Loomans ................................. 108/149 |
| 4,005,898 | 2/1977 | Way ................................... 108/171 X |
| 4,815,396 | 3/1989 | Gehring .................................. 108/149 |
| 5,984,404 | 11/1999 | Novoa et al. ....................... 296/24.1 X |

FOREIGN PATENT DOCUMENTS

| 347490 | 3/1905 | France ..................................... 108/167 |
| 1222120 | 6/1960 | France ..................................... 108/171 |
| 552934 | 12/1956 | Italy ........................................ 108/149 |
| 593564 | 5/1959 | Italy ........................................ 108/170 |
| 290159 | 10/1928 | United Kingdom ................... 108/149 |
| 381652 | 11/1932 | United Kingdom . |
| 439898 | 12/1935 | United Kingdom . |

Primary Examiner—Peter M. Cuomo
Assistant Examiner—Hank V. Tran
Attorney, Agent, or Firm—Bachman & LaPointe, P.C.

[57]                ABSTRACT

A folding table for the interior furnishing of a vehicle comprises a tabletop and two pairs of legs. In order to provide a folding table which does not restrict the leg room and can immediately be folded up, provision is made wherein a) a tabletop is divided in a longitudinal direction to form two halves, the two halves being connected to each other in a foldable manner by a hinge having a hinge pin which is situated below the plane of the tabletop, b) the legs are adapted to be coupled pivotably at one end to the ceiling of the vehicle and at the other end to a point of the tabletop which is remote from the hinge pin.

4 Claims, 2 Drawing Sheets

FOLDING TABLE FOR THE INTERIOR FURNISHING OF VEHICLES

BACKGROUND OF THE INVENTION

The invention relates to a folding table for the interior furnishing of a vehicle, consisting of a tabletop and two pairs of legs. Conceivable places for the folding table are in combat vehicles, camping vehicles, and/or special vehicles set up for office use.

In vehicles as mentioned above, the space conditions are very restricted but a table is nevertheless useful as a table for cards, for working, and/or food table. Customary designs are, for example, the known folding tables having standing legs or ones which are suspended on the ceiling of the vehicle. Both of these impede getting in and out of the vehicle and can either be tipped over because their legs collide with people's legs or they get in the way of standing up.

Accordingly, it is an object of the invention to provide a folding table which does not restrict leg room and which can immediately be folded up into a position in which it does not get in the way of individuals standing up.

SUMMARY OF THE INVENTION

The foregoing object is achieved by way of the present invention wherein a) a tabletop is divided in a longitudinal direction to form two halves, the two halves being connected to each other in a foldable manner by a hinge having a hinge pin which is situated below the plane of the tabletop, b) the legs are coupled pivotably at one end to the ceiling of the vehicle and at the other end to a point of the tabletop which is remote from the hinge pin, one leg of each pair of legs being coupled to one of the halves of the tabletop.

The table is thus suspended from the ceiling or other support structure. Because the hinge pin is below the tabletop, the tabletop remains unfolded in a stable manner because of its inherent weight. When not in use, the tabletop is folded together, by being raised up along the longitudinal divide, this also kinematically causing the outer edges of the tabletop to be raised and to be swung inside, which facilitates getting up.

Various fastening means can be used in order to keep the tabletop in the folded-up position. In a preferred embodiment, the two hinge halves have holes which are spaced apart from the hinge pin and overlap, when the tabletop is folded up, so that a locking bolt can be pushed through. In order to prevent the table from wobbling, diagonal struts can be provided between the two ends of the legs, or their fastenings, of each pair of legs. However, it would also be possible for angle stops to be provided on the legs.

As a further improvement, it is possible for the legs to be pivotable on the ceiling about lengthways bolts which can be pulled out of the bearings on the ceiling. The foregoing prevents the table from swaying in the longitudinal direction and permits rapid removal of the entire table. Finally, when the table is unfolded, it is possible for the legs to enclose an angle with the vertical in the longitudinal direction and/or transverse direction. The legs thus interfere less in the working region.

BRIEF DESCRIPTION OF THE DRAWINGS

In the following, the invention is described and explained with reference to figures, in which.

DETAILED DESCRIPTION OF PREFERRED EMBODIMENT(S)

Figure 1:
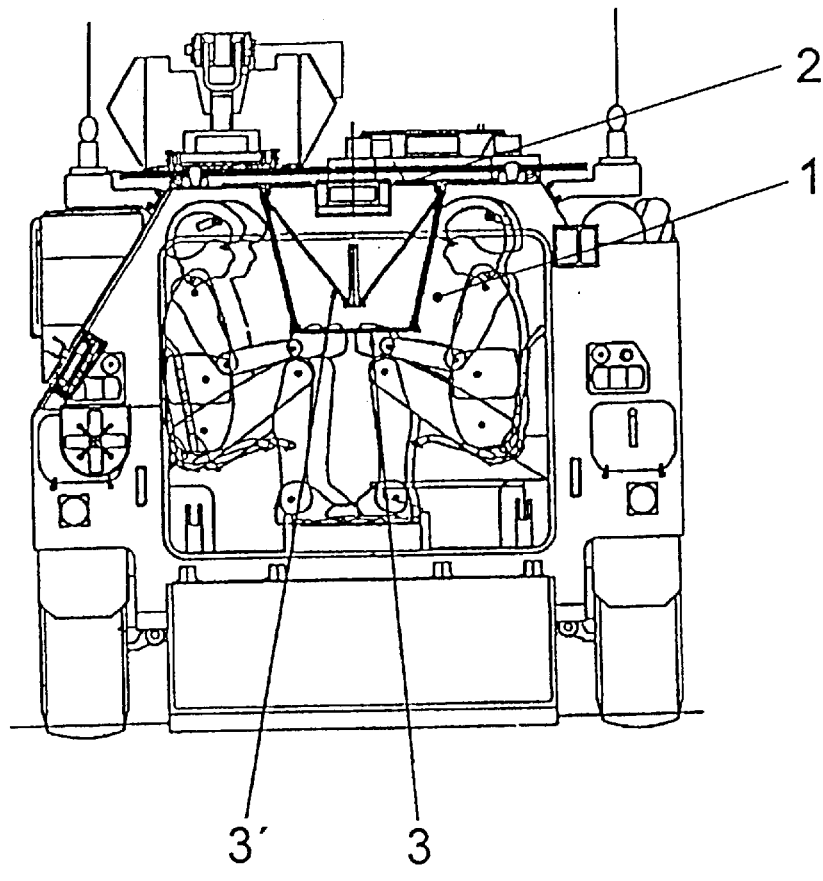
FIG. 1 shows a cross section through the interior of a vehicle having the table according to the invention.
Figure 2:
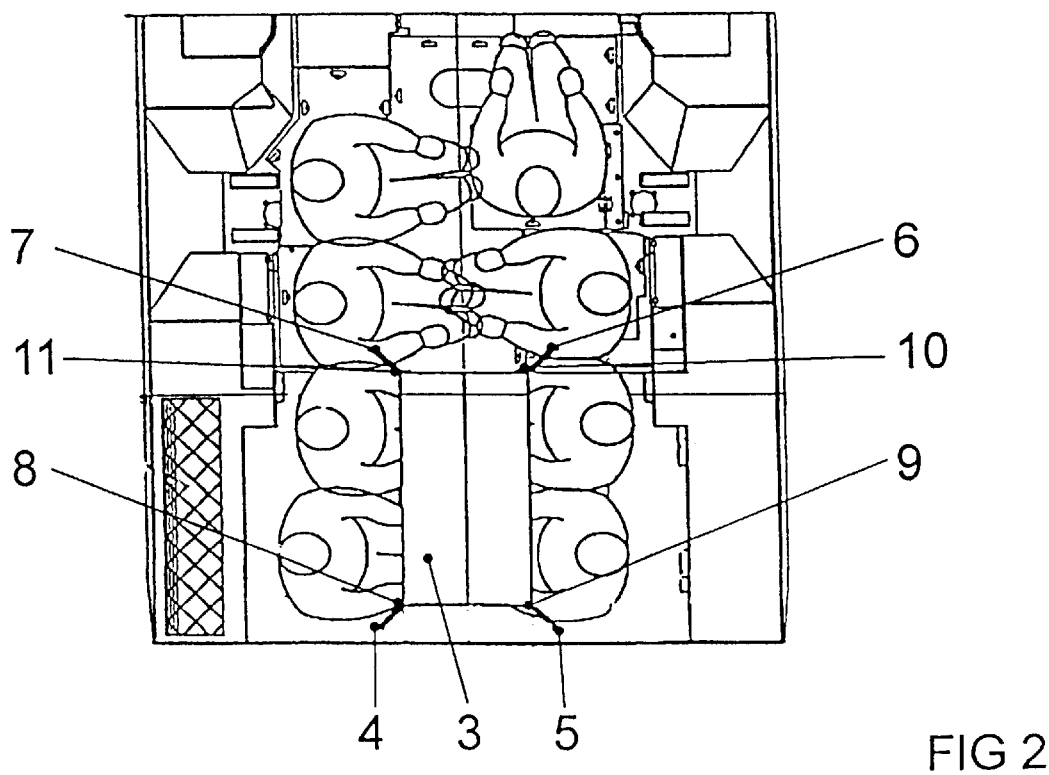
FIG. 2 shows the same interior in a plan view.

It can be seen in FIG. 1 and FIG. 2 how restricted the space conditions are in a combat vehicle. In many camping vehicles the spaced conditions are not much better. The interior 1 is bounded at the top by a ceiling 2 on which a tabletop 3 (in the working position) is suspended. The folded-up position 3' is also shown. The tabletop 3 is suspended at four fastening points on the ceiling 2 of the vehicle, the fastening points 4, 5, 6 and 7 being brought about by suitable fittings. The fastening points on the tabletop are denoted by 8, 9, 10 and 11.

Figure 3:
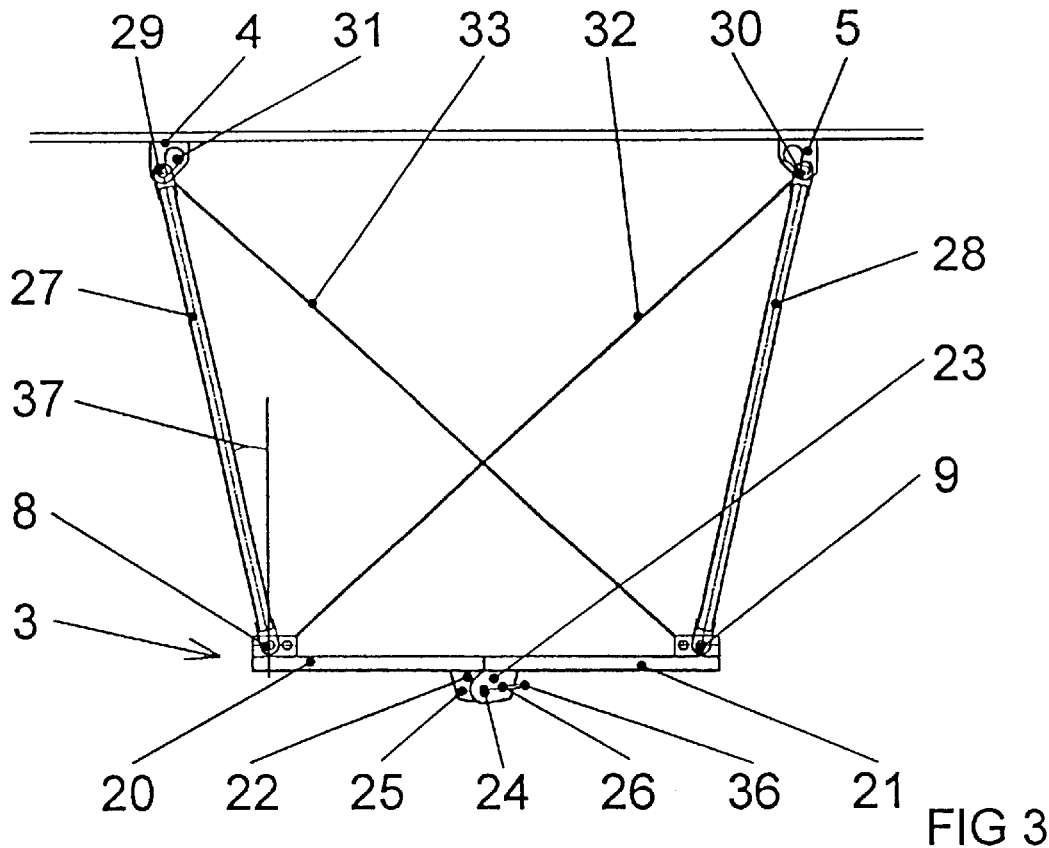
FIG. 3 shows an enlargement of the table from FIG. 1 in the working position.

FIG. 3 shows the table on a larger scale. The tabletop consists of two halves 20, 21 which are connected to each other in a manner such that they can be folded together by hinges consisting of a left and a right half 22, 23 whose hinge pin 24 is situated below the tabletop 3. A plurality of individual hinges or a continuous hinge band can be used as the hinges. The hinge halves 22, 23 are provided with holes 25, 26 which overlap, when the tabletop 3 is folded up, and in this position can be locked by means of a locking bolt 36 which is pushed into the holes 25, 26. In the case of a simple design of the table a touch-and-close fastener or the like suffices.

The table legs 27, 28 are coupled to the fastening points 8, 9 of the tabletop. The legs 27, 28 enclose an angle 37 with the vertical to the tabletop, both in the longitudinal direction and in the transverse direction. They are mounted on the fastening points 4, 5 on the ceiling by means of lengthways pivoting bolts 29, 30 having one degree of freedom and thus can only be pivoted in the transverse direction. To remove the table these pivoting bolts 29, 30 can either be pulled out in the longitudinal direction or pushed upward in the buttonhole 31 and then pulled out. Finally, diagonal struts 32, 33, which prevent the table from swaying in the transverse direction, are furthermore provided. The fastening points 8, 9, 10, 11 on the tabletop 3 lie within the rectangle defined on the ceiling by the fastening points 4, 5, 6, 7. As a result, the legs interfere less with the working region.

Figure 4:
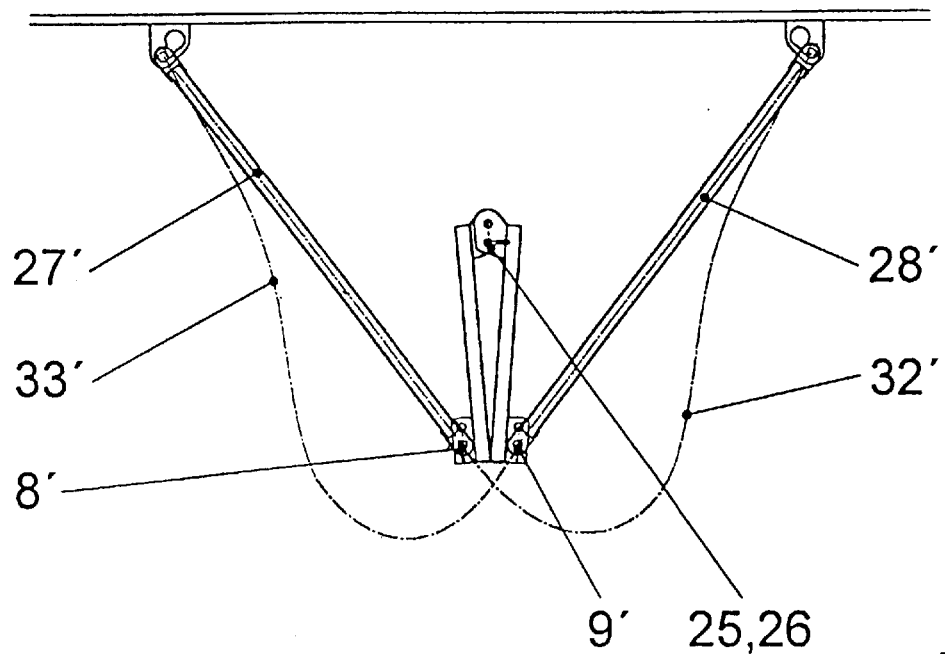
FIG. 4 shows the same table in the folded-up position.

If the table is to be folded up, the tabletop is raised in the center, in the vicinity of the hinge pin 24. Since the entire arrangement is symmetrical about a vertical longitudinal plane, the coupling points 8, 9 are kinematically also caused to be brought into the position 8', 9'(FIG. 4), which is higher than the position 8, 9, as a result of which there is sufficient knee room when standing up. The diagonal struts then sag (32', 33'), if they have not been removed or if angle stops (not shown at all) are used, in order to prevent the table from swaying.

What is claimed is:

1. A folding table for the interior of a confined space, the folding table comprising a tabletop being suspended from support means in the confined space, said tabletop being divided into two halves and being connected to each other in a foldable manner by a hinge having a hinge pin, the hinge being situated on an underside of the tabletop; and two pairs of rigid legs with each leg having means for coupling pivotably at one end to fastening points on the support means and at the other end to a point on an upper side of the tabletop remote from the hinge pin.

2. The folding table as claimed in claim 1, wherein the hinge has two hinge halves each having a hole which are spaced apart from the hinge pin and overlap, when the tabletop is folded up, to receive a locking bolt.

3. The folding table as claimed in claim 1, wherein diagonal struts are provided between the two ends of each of the legs of each pair of legs.

4. The folding table as claimed in claim 1, wherein when the table is unfolded, the legs form an acute angle with a vertical plane of the tabletop.

* * * * *